Patented Oct. 17, 1950

2,526,434

UNITED STATES PATENT OFFICE 2,526,434

INTERPOLYMERS OF STYRENE, AN ALLYLIC FUMARATE, AND AN ALLYLIC ALCOHOL

Pliny O. Tawney, Passaic, N. J., assignor to United States Rubber Company, New York, N. Y., a corporation of New Jersey No Drawing. Application November 29, 1947, Serial No. 788,958

5 Claims. (Cl. 260—78.5)

This invention relates to a new class of unsaturated polymeric materials of relatively low molecular weight which are soluble in a variety of organic solvents and which in the presence of heat and/or catalysts can be converted to insoluble and infusible products by further polymerization or by interpolymerization with other unsaturated organic materials capable of addition polymerization. The invention also includes a method for preparing the new products. My new unsaturated ternary interpolymers are obtained by polymerizing a mixture of styrene, a monomeric allylic fumarate, and a monomeric allylic alcohol.

The new interpolymers are particularly suited to the formation of tough, rigid castings. They are also compatible with hydrocarbon solvents, and are thus adapted economically for the preparation of cheap coating compositions.

It is known to copolymerize styrene with allylic fumarates such as diallyl fumarate, dimethallyl fumarate, etc. Prior workers have emphasized the difficulty of controlling such copolymerizations so as to produce fusible polymers. Various devices for increasing the yield of soluble, fusible copolymers have been advocated such as carrying out the copolymerization at elevated temperatures, preferably in the range of 180° C. or higher. However, since the rate of copolymerization is enormously accelerated at these temperatures, control of the reaction becomes difficult, particularly in a reaction vessel of industrial size, and premature insolubilization of the reaction mixture becomes increasingly difficult to avoid.

It is also known that higher yields of soluble, fusible products can be obtained by copolymerization in the presence of a solvent, the concentration of monomeric allylic fumarate being kept below 40% by weight. However, the rate of polymerization tends to decrease in dilute solutions, the conversion of monomer to polymer is still comparatively inefficient, and the solvent increases the material cost, necessitates additional time and labor for its removal from the reaction product, and lowers the production capacity of the reaction vessel.

I have found, unexpectedly, that copolymerizing styrene with an allylic fumarate in the presence of a sufficient quantity of a monomeric allylic alcohol, by heating the mixture in the range from about 25° C. to about 120° C. (although higher temperatures may be employed if desired), and in the presence of conventional peroxide catalysts, gives high yields of soluble, fusible products. Preferred temperatures are those below 120° C. Examples of suitable catalysts are acetyl peroxide, benzoyl peroxide, acetyl benzoyl peroxide, succinyl peroxide and tertiary-butyl hydrogen peroxide. The course of the copolymerization can be followed by observing the increase in the viscosity of the reaction mixture, and when the copolymerization has proceeded to the desired extent, the reaction is halted by cooling. The resulting interpolymer can be isolated from the reaction mixture by distilling out any unreacted starting materials or by extracting them with a solvent in which the polymer is insoluble, such as gasoline. The interpolymer can be further purified by dissolving it in a solvent for the polymer such as acetone and precipitating it with a non-solvent such as gasoline.

The concentration of monomers in the reaction mixture does not have to be kept below 40%; in fact, the reaction can be carried out in the absence of any solvent other than the copolymerizable monomers themselves. The relative proportions of styrene and allylic fumarate may be varied over a considerable range, depending upon the physical properties desired. The amount of the allylic alcohol used also may be varied and will determine the amount of hydroxymethyl groups in the polymeric product. Interpolymerization of as little as 10% of an allylic alcohol (based on the weight of the allylic fumarate) represses the formation of an insoluble, infusible material during the early stages of the polymerization, and insures the production of a soluble, fusible product. The higher the amount of allylic alcohol present, the higher is the proportion of monomeric fumarate and styrene which can be converted to the polymeric stage without insolubilization; amounts as high as 700% of the allylic alcohol (on the weight of fumarate taken) may be employed, there being no practical advantage in using a yet higher proportion of the alcohol.

The ratio of the styrene to the allylic fumarate, expressed in moles, may usefully range from a value of 0.5:1 to a value of 6:1, in the initial reaction mixture. Starting ratios between 0.5:1 and 2:1 yield products which can be air-cured by baking at 200–400° C. in the form of thin coatings without the aid of peroxidic catalysts, whereas higher starting ratios of styrene yield products which are best cured with the aid of a peroxidic catalyst.

Since my interpolymers are readily soluble in allylic alcohols, I prefer to carry out the copolymerization in the presence of an excess of the allylic alcohol, for the resulting mobile, freeflowing solutions are easily handled in transfer, mixing, storage and other mechanical operations to which the solid interpolymers themselves might be less amenable. The allylic alcohol in my invention thus may serve not only as copolymerizable monomer, but also as a cheap volatile solvent which because it shows little tendency to homopolymerize under these conditions can be easily removed by distillation and recovered for use in subsequent copolymerizations.

The useful allylic fumarates are the esters diallyl fumarate and dimethallyl fumarate.

The useful allylic alcohols are those having the formula

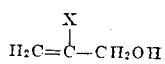

where X is hydrogen, or methyl, illustrated by allyl alcohol, and 2-methylallyl alcohol (customarily referred to as methallyl alcohol).

The styrene may be wholly or partly replaced by para-substituted styrenes such as p-chlorostyrene and p-methylstyrene. However, styrenes which contain a substituent attached to the vinyl group, such as $\alpha$,p-dimethylstyrene, are not operative in my invention.

That my new products are ternary interpolymers is indicated by elementary analysis and other specific tests. They contain, attached to the polymer chain, hydroxymethyl groups derived from the interpolymerized allylic alcohol molecules, which render the copolymers capable of modification by agents reactive with primary alcohols, such agents including alkyl, allylic and acyl halides, organic acids and their anhydrides, organic isocyanates and isothiocyanates, aldehydes, etc., as well as the corresponding polyfunctional compounds such as the dihalides, diisocyanates, polycarboxylic acids, etc. By such reactions, my new interpolymers can be converted into other modified polymers having desirable properties.

My copolymers can be cast or molded in a known manner to form rods, blocks and sheets. They can also be dissolved in an appropriate solvent and employed as lacquers or as impregnating and water-proofing compositions.

Application of heat to compositions containing my unsaturated interpolymers, particularly in the presence of catalysts, induces further polymerization, and the resulting cross-linked products are quite indifferent to heat and are strongly resistant to attack by solvents. Suitable dyes, pigments, fillers and plasticizers can be incorporated with my interpolymers at the soluble, fusible, stage prior to final cure.

My unsaturated interpolymers can be dissolved readily in many organic solvents, particularly in copolymerizable compounds containing an ethylenic linkage such as methyl acrylate, diallyl fumarate, vinyl acetate, allyl acrylate, etc. The resulting solutions can be totally copolymerized to insoluble, infusible products without leaving any solvent to be evaporated. Even at high solids content many of the solutions are still quite fluid, and can be employed as coating materials by spraying, brushing and dipping. They can also be employed in casting, laminating and impregnating operations, particularly where articles capable of being pre-formed and then "set" or cured in a final shape are desired.

The following examples disclose my invention in more detail. All parts are by weight.

EXAMPLE 1

To demonstrate that by copolymerizing a mixture of styrene and an allylic fumarate with an allylic alcohol, gelation of the reaction mixture is repressed and high conversions of the monomers to the interpolymeric form can be achieved without insolubilization, a series of mixtures of an allylic alcohol, styrene, and an allylic fumarate, in varying proportions, are heated at 60° C. with benzoyl peroxide to the point of incipient gelation. The polymerizations are then halted by cooling, and the products are isolated by pouring the reaction mixtures into gasoline. The precipitated interpolymers are then further purified by dissolving them in acetone and precipitating them with gasoline, and after drying the products in vacuo to constant weight, the conversions of monomers to polymers are determined. For purposes of comparison only, similar runs are made in which the allylic fumarates are copolymerized with styrene only.

The results are summarized in Table I showing the weights of the monomers, the peroxide and the purified products, together with the time elapsed at the point of incipient gelation (except that in c, h, i the mixtures did not gel). It is apparent that by interpolymerizing styrene and an allylic fumarate with a sufficient quantity of an allylic alcohol, high yields of soluble, fusible interpolymers are obtained. Comparison of d and e clearly shows the effect of even small amounts of an allylic alcohol in increasing the amount of conversion of a monomeric mixture of styrene and an allylic fumarate to the soluble, fusible polymeric form.

*Table I*

|   | Diallyl Fumarate | Dimethallyl Fumarate | Allyl Alcohol | Methallyl Alcohol | Styrene | Benzoyl Peroxide | Yield | Reaction Time, Hrs. |
|---|---|---|---|---|---|---|---|---|
| a |  | 68.2 |  |  | 31.8 | 1.5 | 12.0 | 2.0 |
| b |  | 68.2 |  | 29.5 | 31.8 | 2.5 | 26.0 | 2.75 |
| c |  | 68.2 |  | 396.0 | 31.8 | 30.0 | 113.0 | ¹ 120.0 |
| d | 65.3 |  |  |  | 34.7 | 1.0 | 12.0 | 2.3 |
| e | 65.5 |  |  | 12.1 | 34.5 | 2.0 | 21.0 | 1 |
| f | 65.3 |  | 23.2 |  | 34.7 | 0.5 | 25.0 | 6.75 |
| g | 65.3 |  |  | 28.8 | 34.7 | 0.5 | 22.0 | 2.75 |
| h | 65.3 |  | 270.0 |  | 34.7 | 6.0 | 124.0 | ¹ 134.0 |
| i | 65.3 |  |  | 270 | 34.7 | 6.0 | 115.0 | ¹ 134.0 |

¹ No gelation.

EXAMPLE 2

A mixture of 65.3 parts of diallyl fumarate, 34.7 parts of styrene, 433 parts of methallyl alcohol and 6.46 parts of benzoyl peroxide is heated for 7 hours at 90–95° C. The polymerization is then halted by cooling the reaction mixture, and a trace of hydroquinone is added to inhibit further polymerization. Unreacted methallyl alcohol is removed by distillation under diminished pressure, and the polymeric residue is purified by repeatedly dissolving it in acetone and precipitating it with gasoline. After drying the interpolymer in vacuo to constant weight, 99.0 parts of solid product are obtained.

*Analysis.*—Found: C, 69.8%; H, 7.21%; iodine No. (Wijs) 116.

The elementary analysis indicates a ternary interpolymer derived from approximately 25.6% by weight of styrene, 62.8% of diallyl fumarate and 12.4% of methallyl alcohol. This corresponds to a conversion of 94% of the monomeric diallyl fumarate and 73% of the monomeric styrene to the interpolymeric form. The iodine number indicates the large amount of unsaturation available in the interpolymer for further polymerization.

A solution of 6.0 parts of the interpolymer dissolved in 4.0 parts of acetone has a viscosity of 0.40 poise at 25° C. The solution is diluted with a mixture of 1.0 part of acetone, 0.5 part of xylene and 0.5 part of cyclohexanone, and is flowed onto a glass panel. After baking at 205° C. for 20 minutes, a clear, colorless adherent film is obtained which is insoluble in acetone, and tack-free even at 200° C.

Seven parts of the soluble interpolymer are dissolved in 3.0 parts of diallyl fumarate together with 0.06 part of benzoyl peroxide. The solution is heated in a mold for 16 hours at 60° C. and then for 5 hours at 100° C. The resulting casting is clear and colorless, is insoluble in organic solvents, and has a Rockwell hardness of M93. A similar casting prepared from 7.0 parts of the soluble interpolymer, 3.0 parts of allyl acrylate and 0.12 part of benzoyl peroxide has a Rockwell hardness of M106.

EXAMPLE 3

This demonstrates the presence of free hydroxyl groups in the ternary interpolymer of Example 2.

Three parts of the interpolymer are dissolved in 10 parts of molten chloroacetic anhydride and the resulting solution is heated at 100° C. for 2 hours. The reaction mixture is then poured into a large excess of cold water, thus precipitating the polymeric product which is purified by repeatedly dissolving it in acetone and precipitating it with water. The product is then dried in vacuo and analyzed for chlorine.

*Analysis.*—Found: Cl, 2.78, 2.86%.

The presence of chlorine in this modified interpolymer clearly indicates that the original interpolymer contains free hydroxyl groups which are capable of esterification with acylating agents such as chloroacetic anhydride.

EXAMPLE 4

In a manner similar to that of Example 2 above, a mixture of 65.4 parts of diallyl fumarate, 34.6 parts of styrene, 348 parts of allyl alcohol and 6.44 parts of benzoyl peroxide is polymerized, and after purification, 103 parts of polymeric solid are obtained.

*Analysis.*—Found: C, 69.8%; H, 7.13%; iodine No. 127; Cl (on chloroacetyl derivative prepared as in Example 3) 4.2, 4.31%.

The analysis corresponds to a ternary interpolymer derived from approximately 49.4% by weight of diallyl fumarate, 26.2% of styrene and 24.4% of allyl alcohol. This corresponds to a conversion of approximately 78% of the monomeric diallyl fumarate and 78% of the monomeric styrene to the interpolymeric form.

A solution of 6.0 parts of the interpolymer in 4.0 parts of acetone has a viscosity of 0.85 poise at 25° C.

Seven parts of the interpolymer are dissolved in 3.0 parts of allyl acrylate together with 0.12 part of benzoyl peroxide. The solution is heated for 16 hours at 60° C. and then for 5 hours at 100° C. The resulting casting is clear, colorless, insoluble in organic solvents and has a Rockwell hardness of M98.

A paste is prepared by dispersing 100.5 parts of titanium dioxide in a solution of 24.75 parts of the interpolymer in an equal weight of xylene, on a 3-roll mill. The paste is then mixed with 150 parts of the above-mentioned 50–50 solution of the interpolymer in xylene and 10 parts of diethyleneglycol monoethyl ether acetate are added. The resulting mixture is thinned with 25% of its volume of xylene and sprayed onto a metal panel. Upon baking for 20 minutes at 400° F. an adherent white, glossy coating is obtained which is not attacked by solvents nor discolored readily by heat and it possesses excellent mar-resistance.

EXAMPLE 5

A mixture of 68.5 parts of dimethallyl fumarate, 31.5 parts of styrene, 393.0 parts of methallyl alcohol and 5.92 parts of benzoyl peroxide is polymerized in the same manner as Example 2 above. After purification, 82 parts of polymeric solid are obtained.

*Analysis.*—Found: C, 71.3%; H, 8.02%; iodine number, 103.

The analysis indicates that the ternary interpolymer is derived from approximately 58.5% by weight of dimethallyl fumarate, 23.8% of styrene, and 17.7% of methallyl alcohol which corresponds to a conversion of approximately 70% of the monomeric dimethallyl fumarate and 63% of the monomeric styrene to the interpolymeric form.

A solution of 6.0 parts of the interpolymer in 4.0 parts of acetone has a viscosity of 0.55 poise at 25° C.

A casting prepared by heating a solution of 7.0 parts of the interpolymer in 3.0 parts of allyl acrylate together with 0.12 part of benzoyl peroxide in a mold for 16 hours at 60° C. and then for 5 hours at 100° C. has a Rockwell hardness of M90. When methyl acrylate is substituted for the allyl acrylate, a similar casting is obtained with a hardness of M82.

EXAMPLE 6

A mixture of 62.5 grams (0.6 mole) of styrene, 196.2 grams (1.0 mole) of diallyl fumarate, 776 grams of allyl alcohol, and 6.47 grams of benzoyl peroxide, was heated at 97° C. (refluxing temperature of the mixture) for 20 hours. The reaction was then stopped by surrounding the vessel with an ice bath. The interpolymer was precipitated as a white solid by pouring the solution into n-hexane, and for purification it was re-dissolved in acetone and re-precipitated with n-hexane. The yield of interpolymer was 17.6%, and the conversion was 71%.

*Analysis.*—Found: C, 68.3%; H, 7.00%. Wijs number, 130.5; limiting viscosity in benzene, 0.08.

A viscous solution of the polymer in xylene/butanol blend containing a few drops of cyclohexanone was poured onto glass and baked for 0.6 hour at 200° C. to form a clear, colorless film which was very hard, and impervious to solvents.

EXAMPLE 7

A mixture of 104.1 grams (1.0 mole) of styrene, 58.9 grams (0.3 mole) of diallyl fumarate, 290 grams of allyl alcohol, and 2.267 grams of benzoyl peroxide, was heated for 20 hours at 84°–90° C., with further equal additions of benzoyl peroxide at the sixth and the twelfth hours of heating. Precipitation and purification carried out as in Example 6 yielded 152 grams of interpolymer (33.6% yield, 93.4% conversion of the styrene and fumarate).

*Analysis.*—Found: C, 78.45%; H, 7.60%. Wijs number, 86.5; limiting viscosity in benzene, 0.18.

Solutions containing 60% of the dried interpolymer of Example 7 dissolved in 40% of methyl methacrylate, together with 0.1% (by weight) of benzoyl peroxide, were heated in a mold for 42 hours at 40° C., and for 2.3 hours at 100° C., respectively, to form hard, clear, colorless castings (Rockwell hardness, L88).

EXAMPLE 8

Reaction mixtures containing styrene in three different ratios to the fumarate were prepared as shown in the following tabulation:

|  | A | B | C |
|---|---|---|---|
| diallyl fumarate | 196 g. (1 mole) | 196 g. (1 mole) | 196 g. (1 mole). |
| styrene | 156 g. (1.5 moles) | 208 g. (2 moles) | 312 g. (3 moles). |
| allyl alcohol | 430 g. | 480 g. | 589 g. |
| xylene (diluent) | 430 g. | 480 g. | 589 g. |
| benzoyl peroxide [1] | 0.80% | 0.80% | 0.80%. |

[1] (On the total batch weight).

Each mixture was heated 10 hours at 98° C. Polymerization was then stopped by the addition of 0.05% (by weight) of hydroquinone. Unreacted allyl alcohol was then stripped out by azeotropic distillation with the xylene, more xylene being added as required, and finally distillation was continued until the solutions reached a 50% concentration of interpolymer in xylene. The conversions obtained were 91, 88.6, and 80.7%, respectively. Such solutions can be utilized directly as coating compositions, preferably with addition of a peroxidic polymerization catalyst, such as benzoyl peroxide, and the films may be hardened by baking at 200°–400° C.

It should be recognized that the compositions as indicated by an interpretation of the analyses are only proximate, since the calculations do not consider various side reactions, e. g., lactonization and alcoholysis which can occur during polymerization and which may have the result of changing the C and H values of the products slightly.

This application is a continuation-in-part of my application Serial No. 580,487, filed March 1, 1945, now abandoned.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. An acetone-soluble, unsaturated interpolymer of (A) a monomeric 2-alkenyl fumarate of the class consisting of diallyl fumarate and dimethallyl fumarate, (B) a 2-alkenyl alcohol of the formula $H_2C=C(X)-CH_2OH$ in which X is a radical from the class consisting of hydrogen and methyl, and (C) a vinylbenzene of the formula $(p-)X-C_6H_4-CH=CH_2$ in which X is a radical from the class consisting of hydrogen, methyl, and chlorine, said interpolymer resulting from heating, in the presence of a peroxidic polymerization catalyst, a polymerizable mixture comprising initially from 0.5 mole to 6 moles of the vinylbenzene per mole of the fumarate, and from 10% to 700% of the said alcohol based on the weight of the fumarate.

2. An interpolymer of diallyl fumarate, styrene, and allyl alcohol, resulting from heating, in the presence of a peroxidic polymerization catalyst, a polymerizable mixture comprising initially from 0.5 mole to 6 moles of styrene per mole of fumarate, and from 10% to 700% of the alcohol based on the weight of the fumarate.

3. An interpolymer of diallyl fumarate, styrene, and methallyl alcohol, resulting from heating, in the presence of a peroxidic polymerization catalyst, a polymerizable mixture comprising initially from 0.5 mole to 6 moles of styrene per mole of fumarate, and from 10% to 700% of the alcohol based on the weight of the fumarate.

4. An interpolymer of dimethallyl fumarate, styrene, and methallyl alcohol, resulting from heating, in the presence of a peroxidic polymerization catalyst, a polymerizable mixture comprising initially from 0.5 mole to 6 moles of styrene per mole of fumarate, and from 10% to 700% of the alcohol based on the weight of the fumarate.

5. A method which comprises heating together (A) a monomeric vinylbenzene of the formula $(p-)X-C_6H_4-CH=CH_2$ in which X is a radical from the class consisting of hydrogen, methyl, and chlorine, (B) a monomeric 2-alkenyl fumarate of the class consisting of diallyl fumarate and dimethallyl fumarate, and (C) a 2-alkenyl alcohol of the class consisting of allyl alcohol and methallyl alcohol, in the presence of a peroxidic polymerization catalyst, and stopping the reaction before the mixture gels, whereby a high yield of an acetone-soluble ternary interpolymer is attained, the proportions of the reactants in the initial mixture being from 0.5 mole to 6 moles of (A) per mole of (B), and from 10% to 700% of (C) based on the weight of (B).

PLINY O. TAWNEY.

REFERENCES CITED

The following references are of record in the file of this patent:

UNITED STATES PATENTS

| Number | Name | Date |
|---|---|---|
| 2,378,195 | D'Alelio | June 12, 1945 |
| 2,441,515 | Snyder | May 11, 1948 |